(12) United States Patent
Rubin

(10) Patent No.: US 8,374,765 B1
(45) Date of Patent: Feb. 12, 2013

(54) CONTROLLED VEHICLE ACCELERATION METHOD USING USER-RESPONSIVE FEEDBACK

(75) Inventor: Stuart H. Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 350 days.

(21) Appl. No.: 12/952,719

(22) Filed: Nov. 23, 2010

(51) Int. Cl.
*B60K 41/20* (2006.01)
*G06F 19/00* (2006.01)

(52) U.S. Cl. .............................. 701/70; 701/77; 701/79

(58) Field of Classification Search .................. 701/70, 701/55, 77, 79; 702/19, 22; 477/94; 705/2, 705/37
See application file for complete search history.

(56) References Cited

U.S. PATENT DOCUMENTS

| | | | |
|---|---|---|---|
| 6,287,237 B1 * | 9/2001 | Graf et al. | 477/94 |
| 7,047,226 B2 | 5/2006 | Rubin | |
| 7,734,404 B2 * | 6/2010 | Shiiba et al. | 701/70 |
| 7,925,605 B1 | 4/2011 | Rubin | |
| 2009/0118948 A1 * | 5/2009 | Heap et al. | 701/55 |
| 2010/0198474 A1 * | 8/2010 | Shiiba et al. | 701/70 |

OTHER PUBLICATIONS

Rubin, Stuart H., "On Randomization and Discovery", Journal of Informational Sciences, vol. 177, issue 1, pp. 170-191, Jan. 2007.
Rubin, Stuart H., "Computing With Words", IEEE Transactions on Systems, Man, and Cybernetics—Part B: Cybernetics, vol. 29, No. 4, pp. 518-524, Aug. 1999.
Rubin, S.H., Murthy, S.N.J., Smith, N.H., and Trajkovic, L., "KASER: Knowledge Amplification by Structured Expert Randomization," IEEE Transactions on Systems, Man, and Cybernetics—Part B: Cybernetics, vol. 34, No. 6, pp. 2317-2329, Dec. 2004.
Chaitin, G.J., "Randomness and Mathematical Proof," Sci. Amer., vol. 232, No. 5, pp. 47-52, 1975.

* cited by examiner

*Primary Examiner* — Tan Q Nguyen
(74) *Attorney, Agent, or Firm* — Ryan J. Friedl; Kyle Eppele

(57) ABSTRACT

A method includes selecting, from a data table containing a plurality of weighted independent variable columns and rows, where each of the columns represents an independent input variable feature and each row represents a set of stored independent input variables and a corresponding stored dependent variable, a row that best matches received sensor independent input variable data from at least one vehicle sensor, causing a vehicle accelerator to gradually accelerate a vehicle to a vehicle acceleration level corresponding to the stored dependent variable of the selected best match row, and modifying a weight of the weighted independent variable columns based upon received user feedback to the vehicle acceleration level. The weights may then be normalized and the received sensor independent input variable data may be stored within a new row of the data table if the weight modification produces a net overall improvement in the data table dependency mapping.

20 Claims, 4 Drawing Sheets

CONTROLLED VEHICLE ACCELERATION METHOD USING USER-RESPONSIVE FEEDBACK

FEDERALLY SPONSORED RESEARCH AND DEVELOPMENT

The Controlled Vehicle Acceleration Method Using User-Responsive Feedback is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil. Reference Navy Case No. 100505.

BACKGROUND

Current vehicle acceleration controllers are typically pre-programmed with a limited number of vehicle acceleration levels. These controllers are unable to effectively modify a vehicle's acceleration level to account for various external conditions, such as road conditions and vehicle engine conditions, and driver preferences, such as fuel-efficiency preferences and driver acceleration preferences. A need exists for a controlled vehicle acceleration method that provides such functionality.

DETAILED DESCRIPTION OF SOME EMBODIMENTS

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

It should be noted that the process steps and instructions of the embodiments could be embodied in software, firmware or hardware, and when embodied in software, could be downloaded to reside on and be operated from different platforms used by a variety of operating systems. Different parts of the algorithm could be embodied in different elements of hardware or software, for example, as in a distributed system.

Figure 1:
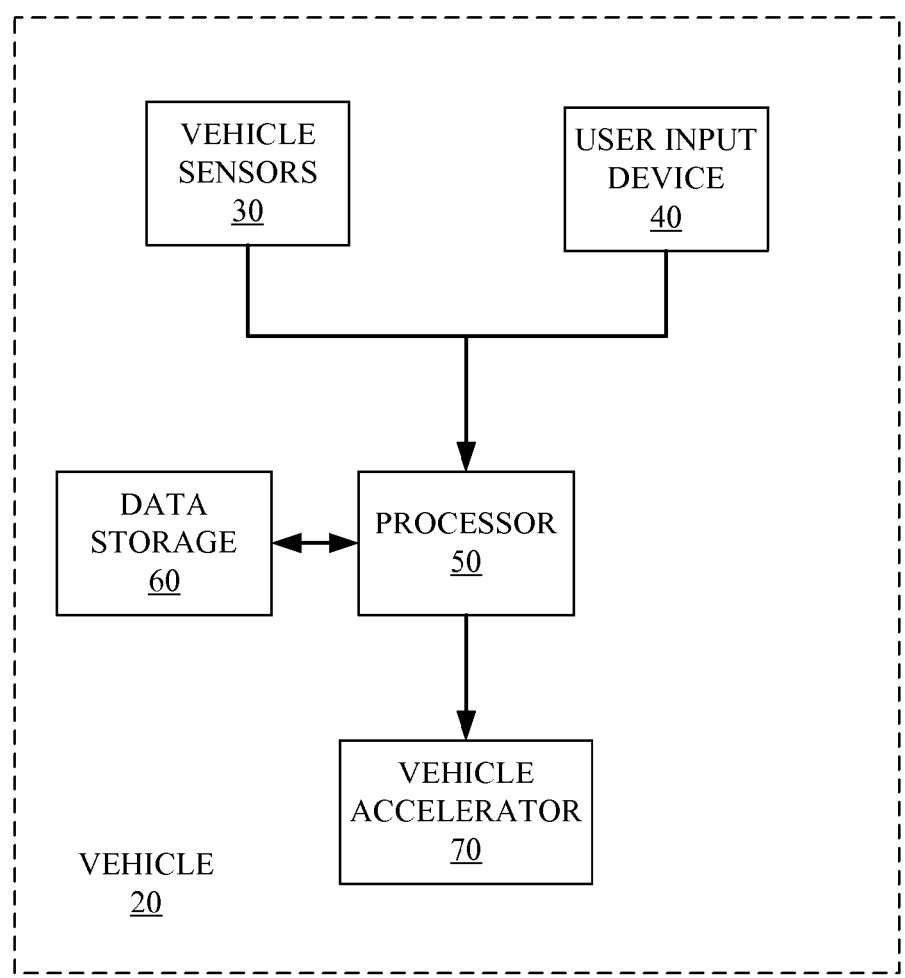
FIG. 1 shows a diagram of an embodiment of a system in accordance with the Controlled Vehicle Acceleration Method Using User-Responsive Feedback.

FIG. 1 shows a diagram of an embodiment of a system 10 in accordance with the Controlled Vehicle Acceleration Method Using User-Responsive Feedback. System 10 may be embodied within a vehicle 20. Vehicle 20 may include one or more vehicle sensors 30, one or more user input devices 40, one or more processors 50, one or more data storages 60, and a vehicle accelerator 70.

Vehicle sensors 30 are connected to processor 50 by either a wired connection, such as a data bus, or wireless connection. Vehicle sensors 30 may include, for example, engine condition sensors, such as a tachometer or temperature sensor, and road condition sensors, such as an optical sensor to detect atmospheric transparency and a RADAR to detect distance to other vehicles or obstacles in the vehicle path. Other vehicle sensors may be employed to detect road covering such as ice, snow, or oil, road grade, ambient light, and the status of upcoming traffic signals.

Examples of user input devices 40 may include switches such as a safety switch, a fuel-efficiency switch, and a transit time switch, as well as a vehicle brake pedal. A user may use user input devices 40 to input user preferences into the system and/or to provide feedback to controlled vehicle acceleration levels, with such input being stored in data storage 60 via processor 50. Some of the user input devices 40 may be located in an area of the vehicle readily accessible by a driver of the vehicle, such as on or below the vehicle dashboard.

Processor 50 may be any device configured to perform computations on analog and/or digital data input. Data storage 60 may be any standard memory device, such as EEPROM, EPROM, RAM, DRAM, SDRAM, or the like. Input data, as received from vehicle sensors 30 or user input devices 40, may be stored in data storage 60 in various ways, such as in a table format. Vehicle accelerator 70 may be a standard vehicle accelerator as equipped on a modern vehicle. In some embodiments, vehicle accelerator 70 may be controlled by a controller (not shown), with such controller being integral to or separate from vehicle accelerator 70.

Figure 2:
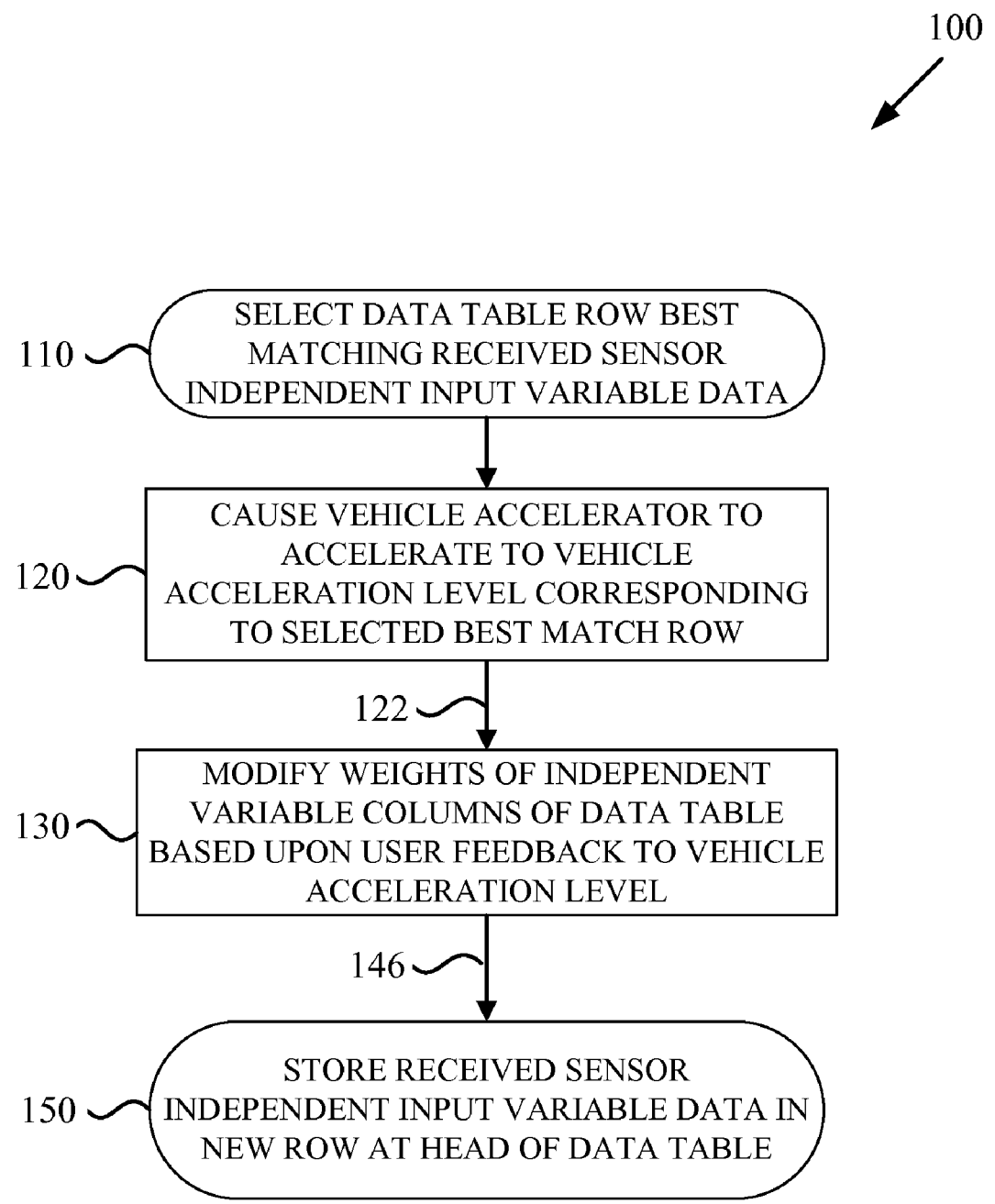
FIG. 2 shows a flowchart of an embodiment of a method in accordance with the Controlled Vehicle Acceleration Method Using User-Responsive Feedback.

FIG. 2 shows a flowchart of an embodiment of a method 100 in accordance with the Controlled Vehicle Acceleration Method Using User-Responsive Feedback. As an example, method 100 may be executed by processor 50 as shown in FIG. 1, with the steps of method 100 being stored as computer-readable instructions in either processor 50 or data storage 60.

Method 100 may begin at step 110, which involves selecting, from a data table containing a plurality of weighted independent variable columns and a plurality of rows, where each of the weighted independent variable columns represents an independent input variable feature and each row represents a set of stored independent input variables and a corresponding stored dependent variable, a row that best matches received sensor independent input variable data from at least one vehicle sensor 30. In some embodiments, the data table may be stored in data storage 60 and may take the general form as shown in Table 1 below.

Using Table 1 as an example, the weighted independent variable columns are indicated by Covering, Grade, V. Wt (vehicle weight), Cond. (condition), MPH (miles-per-hour), Dist. (distance to vehicle/obstacle), View, and Driver, which are independent input variable features (discussed further below). Each column has a respective column weight, namely C.W.1 for column 1, C.W.2 for column 2, and so on. The right-most column of Table 1 represents the stored dependent variable, which corresponds to a particular vehicle acceleration level. The received sensor independent input variable data may represent one or more sensed road conditions, one or more sensed vehicle engine conditions, and/or one or more sensed user acceleration preferences.

Step 110 involves receiving the vehicle sensor independent input variable data and finding and selecting a best match row of the data table, with the best-match row being the row of the data table having stored independent input variables that best match the received sensor independent input variable data.

Step 120 involves causing a vehicle accelerator 70 to gradually accelerate a vehicle to a vehicle acceleration level corresponding to the stored dependent variable of the selected best match row. For example, in Table 1 below, if the first row was selected as the best match row, step 120 would cause vehicle accelerator 70 to gradually accelerate to an acceleration level corresponding to the stored dependent variable associated with the best-match row, in this case, numeral 2 (first row, right-most column). Such correspondence between the stored dependent variable of the best-match row and the acceleration level may be performed by processor 50.

In some embodiments, vehicle accelerator 70 may be caused to accelerate to a vehicle acceleration level (corresponding to the stored dependent variable of the best match row) by being controlled by a control signal output from processor 50. In some embodiments, processor 50 may output a signal to a vehicle accelerator controller (not shown), wherein the controller causes the vehicle accelerator to accelerate the vehicle.

The user may disengage the vehicle accelerator by various methods. For example, the user may disengage the vehicle accelerator may by dashboard switch (i.e., similar to a cruise control), braking, or by "flooring" the accelerator. However, other methods may be used as recognized by one having ordinary skill in the art. Such methods may also be used to provide user feedback regarding the acceleration level.

In some embodiments, the control signal from processor 50 is smoothed before being output to vehicle accelerator 70 to ensure that vehicle accelerator 70 transitions smoothly from one level of acceleration to the next. Such smoothening can be performed within processor 50 or by a separate controller of vehicle accelerator 70. To smooth the signal, the ten levels of dependent acceleration should be ordered along a continuum such that acceleration i is closer to acceleration i+1 than it is to acceleration i+2. Thus, if one were to accelerate from acceleration level 2 to acceleration level 8, there should be a continuous sequence of acceleration levels to be passed through. The same is not necessarily true for deceleration, which is under the control of the braking system. As an example, the smoothing algorithm will accelerate for one second at each intervening level (e.g., levels 3, 4, 5, 6, and 7) before stabilizing on the highest acceleration. Each acceleration level may have its own time for transient acceleration, which is vehicle dependent. Furthermore, the time for transient acceleration may be table driven to account for the spread differential as well as the current vehicle speed.

The following variables may impact vehicle acceleration and its control.
1. Road covering—ice, snow, water, oil, gravel; for example, too rapid an acceleration on snow or ice will cause the rear of the car to waiver in and out.
2. Grade—a steep grade requires more acceleration.
3. Vehicular weight—the heavier the vehicle, the greater the need for acceleration, all else being equal.
4. Inspected condition—cleaner engines require slightly less fuel. Also, better condition equates to a safer vehicle.
5. The speed limit—acceleration is rarely a license to exceed the set safe speed limit.
6. Current vehicular speed—the closer the current speed to the limiting speed, the less acceleration that is needed.
7. Distance to vehicle or obstacle immediately ahead—one must be sure not to accelerate until the car in front has. On-board Doppler radar may be used here and exists at the scale of a single chip.
8. Atmospheric transparency—as measured by an optical sensor.
9. Ambient light—as measured by a photocell, acceleration usually needs to be dampened in a dark environment for safety's sake.
10. Driver skills/fears at the time—one does not want to accelerate beyond the driver's comfort zone.
11. (Optional) Traffic lights, which transmit their time before changing color—don't accelerate into a soon-to-be red light.
12. (Optional) Driver-dependent variables—don't drive on sunny snow without sunglasses; don't drive on certain medications; reduce speed where one can't distinguish the highway divider; and, all degrees in between.

A data mining algorithm may be used by processor 50 for controlling vehicle accelerator 70. The data mining algorithm may use the following input variables; however, it should be clear that any or all of these inputs may be extended in scope or number:
1. Road covering—danger factors from 1 to 10 with melting ice being most dangerous (1) and dry asphalt being least dangerous (10).
2. Grade—danger factors from 1 to 10 with ±45 deg. or greater being most dangerous (1) and 0 deg. being least dangerous (10).
3. Vehicular weight—danger factors from 1 to 10 with vehicle exceeding its towing limit being most dangerous (1) and vehicle at its recommended weight being least dangerous (10). Underweight vehicles center about a rating of (5) due to the increased danger presented by low traction.
4. Inspected condition—danger factors from 1 to 3 with automobile being 10 years or more old, exceeding 100,000 miles, or not having been serviced when recommended being most dangerous (1); otherwise automobiles over 5 years old or over 50,000 miles being a (2), otherwise being least dangerous (3).
5. The speed limit—danger factors from 1 to 7 with over 70 mph being the most dangerous (1), 60-70 mph being next most dangerous (2), 50-60 mph being next most dangerous (3), . . . , under 20 mph being the least dangerous (7).
6. Current vehicular speed—danger factors from 1 to 7 with over 70 mph being the most dangerous (1), 60-70 mph being next most dangerous (2), 50-60 mph being next most dangerous (3), . . . , under 20 mph being the least dangerous (7).
7. Distance to vehicle or obstacle immediately ahead—danger factors from 1 to 10 with 0 to 10 feet being most dangerous (1), 10-20 feet being next most dangerous (2), . . . , 90 or more feet being least dangerous (10).
8. Atmospheric transparency—danger factors from 1 to 10 with 0 to 100 feet being most dangerous (1), 100-200 feet being next most dangerous (2), . . . , 900 or more feet being least dangerous (10).
9. Ambient light—danger factors from 1 to 10 with photometer readings of 0 to 10 being the darkest and thus most dangerous (1), 10-20 being next most dangerous (2), . . . , 90 or more being the brightest and thus least dangerous (10). Note that snow blindness is not measured here as it is assumed that no light could be too bright given that the driver dons appropriate eyewear.
10. Driver skills/fears at the time—one may fuse a myriad of sensors that measure everything from reflex time to alcoholic breadth to blood chemistry, or for purposes herein rate the driver on a self-assessed descriptor from 1 to 10 with 1 implying that the driver feels that he/she should not be on the road to 10 implying that the time is ideal for a road trip.

The above variables may be considered the raw variables, which are used to determine the amount of fuel injected into the vehicle engine upon all but "flooring" the accelerator. Given the aforementioned variables to the exclusion of all else, there are 10×10×10×3×7×7×10×10×10×10=1,470,000,000 states. This is too many to use to develop a reliable control system. Instead, the maximal features should be extracted to reduce complexity. Thus, the raw variables may be pre-processed into salient features as follows:

1. Road covering (raw data)
2. Grade (raw data)
3. Vehicular weight (raw data)
4. Inspected condition (raw data)
5. MPH below the speed limit—danger factors from 1 to 7 with being 70 or more mph below the limit being the most dangerous (1) to being 10 mph or less below the speed limit being the least dangerous (7).
6. Distance to vehicle or obstacle immediately ahead (raw data)
7. Atmospheric transparency and ambient light (view)—danger factors from 1 to 10, where the fused sensor uses a CCD device (e.g., to discriminate parallel lines) to measure the maximal distance the driver can see. This distance is proportional to both atmospheric transparency and ambient light with
   a. 0-100 feet being most dangerous (1)
   b. 100-200 feet being more dangerous (2)
   c. . . .
   d. 900 or more feet being least dangerous (10)
8. Driver skills/fears at the time (raw data).

Using these two features cuts the number of states by a factor of 7×10, resulting in 21 million states. Thus, a data mining algorithm is needed to find commonalities among states as well as to pair such states with their proper raw control signal. Data mining, as defined in the literature, does not find commonalities among states. Rather, it just serves to eliminate uncorrelated data. This description additionally serves to widen the data mining definition. At this point, the definition of the data mining algorithm can be completed. First, what is being mined must be examined, along with why established technologies such as neural networks cannot substitute.

A control signal, such as that produced by processor 50 to cause vehicle accelerator 70 to accelerate the vehicle, may have values from 1-10 along a continuum, where 1 represents the slightest gradual acceleration and 10 represents just short of "flooring" it. Table 1 below, is a representative, but in no way binding population. The problem is that there would be 21,000,000 rows required to completely populate this table (here we show only 4 rows). A personal computer has such storage available, but there is no practical way to put a test car through that many paces and the search time for 21 million rows would be longer than otherwise necessary. Indeed, this relates to a shortcoming of neural network technologies. That is, they cannot be expected to perform well on data that is even slightly outside of their training set (unlike humans). That and the fact that their training time is NP-hard makes their performance unsuited to predicting the proper acceleration given the aforementioned set of independent variables. Rather, the data mining system discussed herein achieves this in polynomial time through the implementation of a heuristic search methodology, which interpolates the recorded data points or rows as in Table 1. Neural networks cannot do the same because they cannot effect modus ponens, or the capability if given, a→b, and a, then conclude b.

TABLE 1

The Data Mining Schema

| Covering C.W.1 | Grade C.W.2 | V. Wt. C.W.3 | Cond. C.W.4 | MPH↓ C.W.5 | Dist. C.W.6 | View C.W.7 | Driver C.W.8 | → | Control |
|---|---|---|---|---|---|---|---|---|---|
| 1-10 | 1-10 | 1-10 | 1-3 | 1-7 | 1-10 | 1-10 | 1-10 | | 1-10 |
| 1 | 10 | 5 | 2 | 7 | 7 | 2 | 5 | | 2 |
| 2 | 10 | 5 | 3 | 6 | 7 | 2 | 6 | | 2 |
| 9 | 9 | 8 | 3 | 3 | 6 | 10 | 8 | | 8 |
| 8 | 8 | 7 | 1 | 3 | 5 | 9 | 8 | | 7 |

In some embodiments, the data mining algorithm may seek to find a near minimum number of rows to be stored in a schema (such as shown above in Table 1) such that the number of errors made in classifying the dependency for an arbitrary independent set is minimized (if not zeroed). The matching task, and weight modification, may be defined by the minimization of $$\sum_{i=1}^{n} w_i(x_i - y_i)^2$$

for each of m rows in the schema, where w is a weight, x is the sampled instance, and y is the unknown independent variable. The greater the weight, the more important the factor and vice versa, where w∈(0,1]. If $(x-y)^2$ is allowed to grow too large, then other independents will tend to overlap it, and thus the dependencies will potentially be incorrectly predicted.

Conversely, if $(x-y)^2$ is not allowed to grow large enough, then other independents will not overlap it and thus the dependencies in the same class will not be properly predicted. In this situation, an excess of rows will need to be acquired by the schema, which will unnecessarily slow down the algorithm that controls the accelerator.

Suppose that row 1 is acquired by the schema. The minimum number of rows in the schema is given by the number of distinct dependencies, which are ten in the present case. The aforementioned method will find that row 2 is minimized by row 1 and correctly predict, $\{2, 10, 5, 3, 6, 7, 2, 6\} \rightarrow \{2\}$ under uniform weighting. However, consider row 3. Being this is the first exposure to a dependency of 8, the schema cannot possibly correctly predict it and $\{9, 9, 8, 3, 3, 6, 10, 8\} \rightarrow \{8\}$ must be acquired.

Two options, which are not mutually exclusive, are available. One option is to add the erroneous mapping to the schema using the correct dependency so that it will serve as a seed for future mappings. Here, the sum would result in the absolute minimal of zero for the idempotent case. Second, the weights, w, may be modified to encompass the new set of independent variable while excluding all independent variables previously found to be associated with a different dependency in the schema. This approach may be used if the dependency is already known by the schema. If such mappings cannot be immediately found, it is proper to augment the schema with the mapping. The temporal savings justifies the slight spatial cost.

Consider the first two rows of Table 1 using a uniform weighting scheme. Here, $$M(2, 1) = \frac{\sum_{i=1}^{n}(x_i - y_i)^2}{n} = 0.5.$$

Likewise $$M(2, 3) = \frac{\sum_{i=1}^{n}(x_i - y_i)^2}{n} = 17.125$$

and $$M(2, 4) = \frac{\sum_{i=1}^{n}(x_i - y_i)^2}{n} = 14.25.$$

Thus, there would be no reason to change the uniform weighting scheme to correctly predict the dependency for the second row, or 2, as grouped with the first row, where a perfect match has the computed M-value of zero. A new row is assigned to that dependency grouping for which it computes a minimal average M-value. However, suppose for row j, $$M(2, j) = \frac{\sum_{i=1}^{n}(x_i - y_i)^2}{n} \leq 0.5$$

with dependency other than 2. Can the weighting scheme be altered such that $M(2, j) > 0.5$ and $M(2, k) > 0.5$, where $M(2, k) > 0.5$ previously (i.e., to preserve its relations)? Alternatively (or at the same time), can the weighting scheme be altered such that $M(2, 1) < M(2, j)$ to insure a proper group assignment? The answer to these questions is an affirmation as will be further discussed below.

Refer to Table 1 and the Grade, V.Wt., Dist., and View columns. Notice that no matter what the weight assigned to these columns, x=y in the computation of M(2, 1). Thus, increasing these weights will leave M(2, 1) unaltered for these variables with an overall likely decrease in value due to normalization; but, will likely though not guaranteed, increase the value of M(2, k) for these variables, which is balanced by a decrease of the same magnitude on average for the remaining variables so that for the other dependencies there will be no change in value, as desired.

Similarly, refer to Table 1 and the Covering, Cond., MPH↓, and Driver columns. Decreasing one or more of their weights will reduce M(2, 1) and M(i, j) alike. However, by reducing all of the weights for the Covering, Cond., MPH↓, and Driver columns, the reduction is most likely to be proportionately greatest for M(2, 1) because the choice of columns whose weight is to be reduced is based on those independent variables, which have maximally different values and have the same dependencies. Similarly, the choice of columns whose weight is to be increased is based on those independent variables, which have very close to the same (if not identical) values and have the same dependencies. The number of variables whose weights are to be so changed is to be minimized to thwart unwanted side effects, which take the form of introducing improper classifications from previously proper ones. One way to accomplish this is to rank-order these variables on the basis of nearness, or $(x-y)^2$, and use these values in a spiral search.

The search using a select number of variables stops when a previously properly classified dependency becomes improperly classified (or a select percentage of improper classifications is exceeded for other fuzzy applications). This includes the starting point, which is the new set of independents having a duplicate dependency in the schema. Note that this automotive acceleration application is not fuzzy (except perhaps for the allowed percentage of incorrect fuzzy maps) because it is sufficiently "discretized"—without the need for continuous variables. The need to augment the schema follows a failure, which includes all variables (columns).

Finally, reducing and increasing the weights proceeds by a factor of two for a single iteration, where the resultant weight set is immediately re-normalized. Note that it cannot be known ahead of time what weight will work best given the likelihood of future acquisitions. Doubling or halving is used because halving is the midpoint for any weight change and doubling its inverse. The need for computational efficiency precludes other more exhaustive searches; although, not necessarily more useful given that the task is to map the as yet unknown independent variables.

Figure 3A:
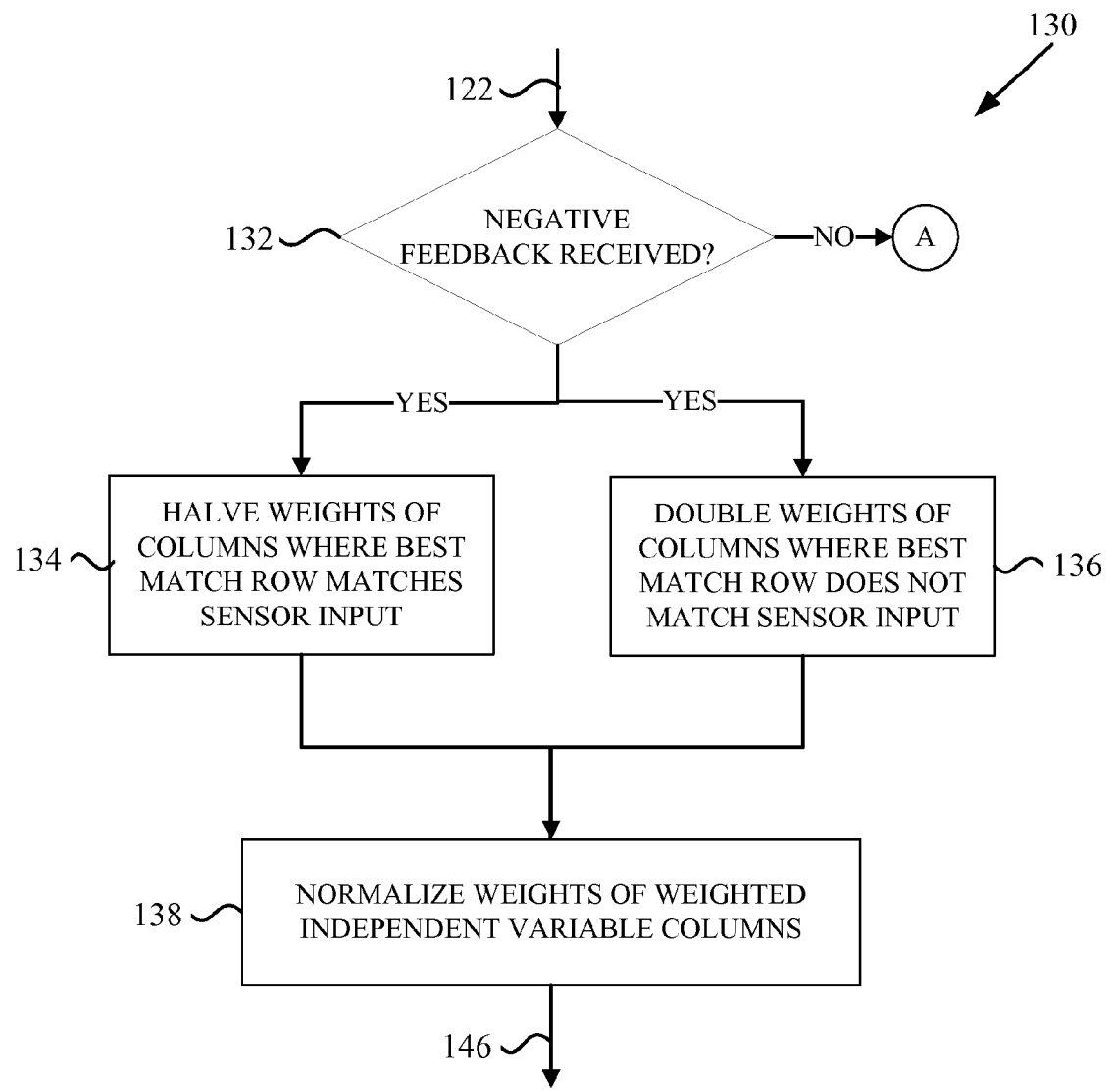
FIGS. 3A and 3B show flowcharts of an embodiment of a step for modifying column weights in accordance with the Controlled Vehicle Acceleration Method Using User-Responsive Feedback.
Figure 3B:
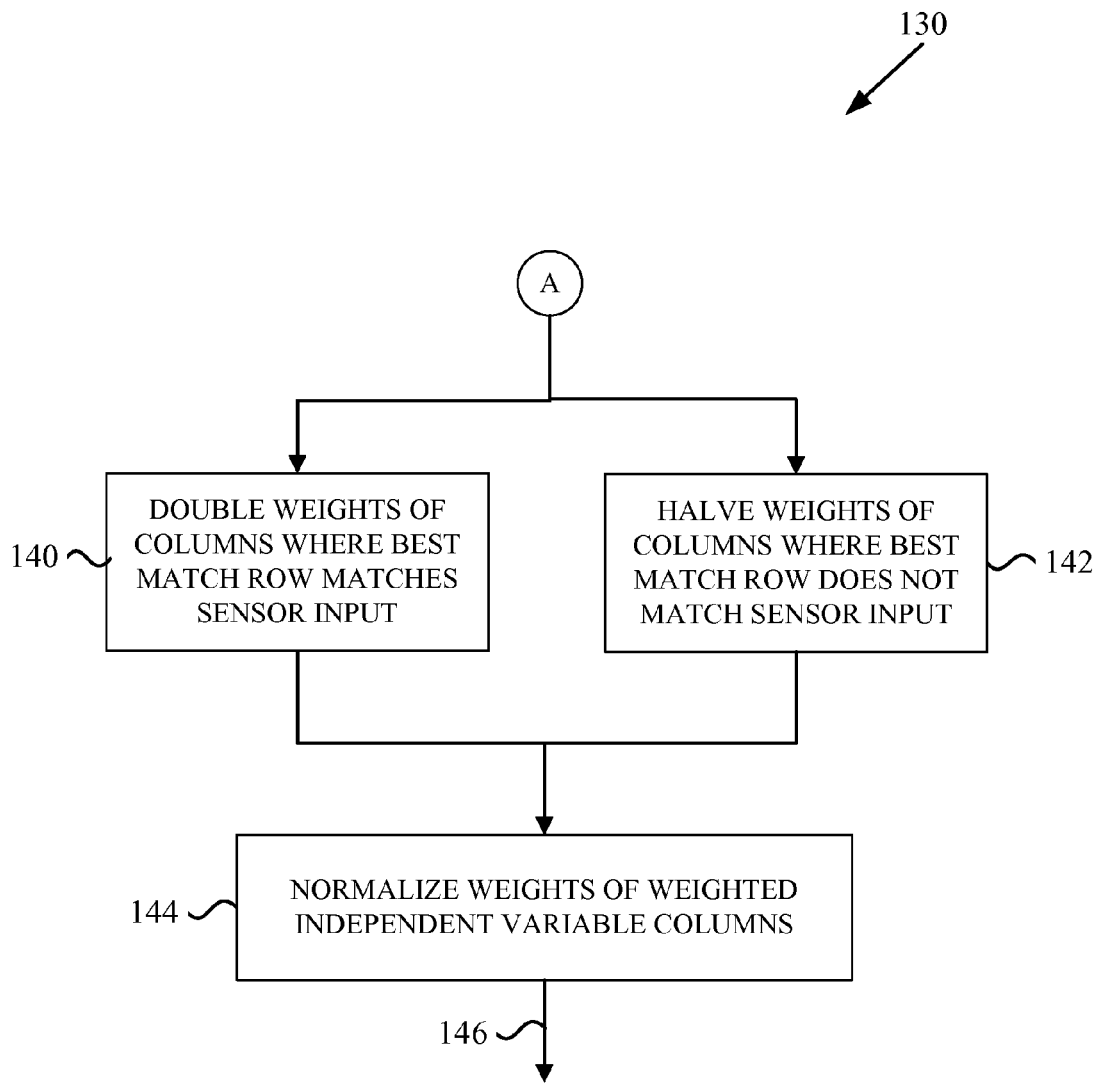

Step 130 involves modifying a weight of one or more of the weighted independent variable columns based upon received user feedback to the vehicle acceleration level. FIGS. 3A and 3B show flowcharts of an embodiment of step 130 of method 100. Step 130 may begin at step 132, where a determination is made as to whether negative feedback has been received. In most embodiments, negative feedback will be received from the user by means such as the user input devices 40. As an example, a user may hit the brake pedal if the vehicle accelerates too fast. If negative feedback is received, step 130 may proceed to either or both of steps 134 and 136. Step 134 involves decreasing the weights of the independent variable columns wherein the best match row independent input variables match the received sensor independent input variable data. As an example, step 134 may involve halving the weights. Step 136 involves increasing the weights of the independent variable columns wherein the best match row independent input variables does not match the received sensor independent input variable data. As an example, step 136 may involve doubling the weights. Following steps 134 and 136, step 138 involves normalizing all of the weights of the weighted independent variable columns. Step 130 may then proceed to step 150 along flow path 146.

Referring back to step 132, if negative feedback is not received, meaning either no feedback or positive feedback is received, step 130 may proceed to either or both of steps 140 and 142. No feedback received means that the user performs no action with respect to the change in vehicle acceleration. Positive feedback may be input by a user by means such as the user input devices 40. As an example, a user may touch a dashboard button to indicate an acceptance of the chosen vehicle acceleration level.

Step 140 involves increasing the weights of the independent variable columns wherein the best match row independent input variables match the received sensor independent input variable data. As an example, step 140 may involve doubling the weights. Step 142 involves decreasing the weights of the independent variable columns wherein the best match row independent input variables does not match the received sensor independent input variable data. As an example, step 142 may involve halving the weights. Following steps 140 and 142, step 144 involves normalizing all of the weights of the weighted independent variable columns. Step 130 may then proceed to step 150 along flow path 146.

It should be recognized by one having ordinary skill in the art that the modification of the weights performed in step 130 may involve increasing or decreasing the weights by any fraction or amount, so long as the weights are subsequently normalized.

In some embodiments, the weight modification performed in step 130 includes modifying the weight of the weighted independent variable columns having a dependent variable matching the dependent variable of the best match row such that M (x, y) is minimized, $$M(x, y) = \sum_{i=1}^{n} w_i(x_i - y_i)^2,$$

where n is the number of the weighted independent variable columns having a dependent variable matching the dependent variable of the best match row, w is a weight of a independent variable column, x is a stored independent input variable for a particular independent variable column, and y is a received sensor independent input variable corresponding to the same independent variable column as the stored independent input variable.

Following step 130, method 100 may then proceed to step 150. Step 150 involves storing the received sensor independent input variable data within a new row of the data table if the weight modification produces a net overall improvement in dependency mapping by the data table. In other words, if the dependency mapping is improved by adding the new row, it is added to the data table.

As an example, in some embodiments, method 100, as described herein, may include the following steps:
1. Create an initial set of {independent variables}→{dependent variables}.
2. Extract maximal features to minimize the complexity of predicting the dependencies. A sample result is presented in Table 1.
3. If an exhaustive mapping is practical, then exit with that population.
4. Next, minimize (if not zero) the number of errors made in classifying the dependency for an arbitrary independent set.
5. Minimize $$M(x, y) = \sum_{i=1}^{n} w_i(x_i - y_i)^2$$

for each of m rows in the schema as shown below, where w is a weight, x is a row of independent variables saved in the schema, and y is the row of as of yet un-acquired independent variables. The greater the weight, the more important the factor and vice versa, where w∈(0,1].
6. The minimum number of rows in the schema is given by the number of distinct dependencies. If there is more than one dependent variable, then this minimal number is given by the product of the number of distinct dependencies for each dependent variable minus the number of non-viable combinations, if any.
7. If the correct dependency, or combination of correct dependencies, is unknown in the schema, then acquire {independent variables}→{dependent variables}.
8. Otherwise, the weights, w, are tweaked in an attempt to encompass the new set of independents while excluding all independents previously found to be associated with a different dependency in the schema:
    a. Here, there exists at least one row in the schema having the identical dependency. For each such row, label the independent variables for which x=y, where $x_i$ is the independent variable for an existing row in the schema and $y_i$ is an independent variable in the new row. Find that pairing of rows, having the same dependency, and having the greatest number of such variables in common with each other and with others in the same dependency grouping, if any. In other words, we want to include those weights where the average squared deviation of the column values from the mean of those column values is minimized. Thus, the columns will be selected in order of increasing (i.e., non-decreasing) variance, or $$\sigma^2 = \frac{\Sigma(X - u)^2}{N}.$$

Break ties arbitrarily.
    b. Notice that any change to the weights, w, for these variables will likely decrease M(x, y), but is likely to leave unchanged or even increase the weighted value for other pairings for which x>y. Up to the floor of half the weights may be so changed.

c. For each row in the schema having the identical dependency, label the independent variables in order of decreasing (i.e., non-increasing) variance, or $$\sigma^2 = \frac{\sum (X-u)^2}{N}.$$

Break ties arbitrarily.
d. Notice that any change to the weights, w, for these variables is likely to alter any pairing for which x>z, but maximally alter M(x, y). Up to the floor of half the weights may be so changed.
e. An attempt is made to include the new row in the mapping for the existing matched dependency as follows. Using the existing weights, all initialized upon cold start to 1/n and summing to unity, the new row is assigned to that dependency class for which M(x, y) is a closest match.
f. On comparison with the correct dependency class, this assignment is either correct or requires M(x, y) to be reduced or increased.
g. If M(x, y) is to be reduced, then double the weights identified in (b), since one way to reduce is to increase the weights of M(x, z), which will have less effect on M(x, y) on average. Also, halve the weights identified in (d), since the other way to reduce is to decrease the weights of M(x, y), which will have less effect on M(x, z) on average.
h. If M(x, y) is to be increased, then halve the weights identified in (b), since one way to increase is to decrease the weights of M(x, z), which will have less effect on M(x, y) on average. Also, double the weights identified in (d), since the other way to increase is to increase the weights of M(x, y), which will have less effect on M(x, z) on average.
i. Renormalize the weight vector.
j. Re-compute the classification for each of m rows—grouping on the basis of the computed dependencies. If a previously correct dependency is now rendered incorrect (or the percentage incorrect now exceeds threshold for fuzzy applications), then restore the weights to their values prior to tweaking and proceed to the next integer step. Note that iteration is not performed due to the unacceptable space-time tradeoff after the first pass.
k. If the new row is correctly classified, exit with success.
9. If the new {independent variables}→{dependent variables} has not been covered by the previous step (i.e., by default), then augment the schema with the new row.

A computing system may be configured with the appropriate software modules to perform methods as discussed herein. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

The Controlled Vehicle Acceleration Method Using User-Responsive Feedback described herein may be implemented as a series of modules, either functioning alone or in concert with physical electronic and computer hardware devices. Such modules may be utilized separately and/or together locally and/or remotely to form a program product thereof, that may be implemented through signal-bearing media, including transmission media and recordable media. The methods described herein may be implemented as a program product comprised of a plurality of such modules, which can be interactively displayed for a user on a display screen of a data-processing system (e.g., computer). Such interactivity may be provided by a specialized graphical user interface (not shown).

Some or all of the steps of method 100 may be stored on a computer readable storage medium, wherein the steps are represented by computer readable programming code. The steps of method 100 may also be computer-implemented using a programmable device, such as a computer-based system. Method 100 may comprise instructions that, when loaded into a computer-based system, cause the system to execute the steps of method 100. Method 100 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Further, many modifications and variations of the Controlled Vehicle Acceleration Method Using User-Responsive Feedback are possible in light of the above description. Within the scope of the appended claims, the Controlled Vehicle Acceleration Method Using User-Responsive Feedback may be practiced otherwise than as specifically described. Further, the scope of the claims is not limited to the implementations and embodiments disclosed herein, but extends to other implementations and embodiments as may be contemplated by those having ordinary skill in the art.

I claim:

1. A computer-implemented method comprising the steps of:
   selecting, from a data table containing a plurality of weighted independent variable columns and a plurality of rows, wherein each of the weighted independent variable columns represents an independent input variable feature and each row represents a set of stored independent input variables and a corresponding stored dependent variable, a row that best matches received sensor independent input variable data from at least one vehicle sensor; and
   causing a vehicle accelerator to gradually accelerate a vehicle to a vehicle acceleration level corresponding to the stored dependent variable of the selected best match row; and
   modifying a weight of one or more of the weighted independent variable columns based upon received user feedback to the vehicle acceleration level.

2. The computer-implemented method of claim 1, wherein the step of modifying a weight of one or more of the weighted independent variable columns comprises, if negative user feedback is received, decreasing the weights of the independent variable columns wherein the best match row independent input variables match the received sensor independent input variable data.

3. The computer-implemented method of claim 1, wherein the step of modifying a weight of one or more of the weighted independent variable columns comprises, if negative user feedback is received, increasing the weights of the independent variable columns wherein the best match row independent input variables does not match the received sensor independent input variable data.

4. The computer-implemented method of claim 1, wherein the step of modifying a weight of one or more of the weighted independent variable columns comprises, if positive user feedback is received, increasing the weights of the independent variable columns wherein the best match row independent input variables match the received sensor independent input variable data.

5. The computer-implemented method of claim 1, wherein the step of modifying a weight of one or more of the weighted independent variable columns comprises, if positive user feedback is received, decreasing the weights of the independent variable columns wherein the best match row independent input variables does not match the received sensor independent input variable data.

6. The computer-implemented method of claim 1, wherein the received sensor independent input variable data represents one or more sensed road conditions.

7. The computer-implemented method of claim 1, wherein the received sensor independent input variable data represents one or more sensed vehicle engine conditions.

8. The computer-implemented method of claim 1, wherein the received sensor independent input variable data represents one or more sensed user acceleration preferences.

9. The computer-implemented method of claim 1, wherein the step of modifying a weight of one or more of the weighted independent variable columns comprises normalizing all of the weights of the weighted independent variable columns.

10. The computer-implemented method of claim 1 further comprising the step of, after modifying a weight of one or more of the weighted independent variable columns, storing the received sensor independent input variable data within a new row of the data table if the weight modification produces a net overall improvement in dependency mapping by the data table.

11. The computer-implemented method of claim 1, wherein the step of modifying a weight of one or more of the weighted independent variable columns comprises modifying the weight of the weighted independent variable columns having a dependent variable matching the dependent variable of the best match row such that M (x, y) is minimized, where $$M(x, y) = \sum_{i=1}^{n} w_i(x_i - y_i)^2,$$

where n is the number of the weighted independent variable columns having a dependent variable matching the dependent variable of the best match row, w is a weight of a independent variable column, x is a stored independent input variable for a particular independent variable column, and y is a received sensor independent input variable corresponding to the same independent variable column as the stored independent input variable.

12. A computer-implemented method comprising the steps of:
   selecting, from a data table containing a plurality of weighted independent variable columns and a plurality of rows, wherein each of the weighted independent variable columns represents an independent input variable feature and each row represents a set of stored independent input variables and a corresponding stored dependent variable, a row that best matches received sensor independent input variable data from at least one vehicle sensor; and
   causing a vehicle accelerator to gradually accelerate a vehicle to a vehicle acceleration level corresponding to the stored dependent variable of the selected best match row;
   modifying a weight of one or more of the weighted independent variable columns based upon received user feedback to the vehicle acceleration level, such modification including modifying the weight of the weighted independent variable columns having a dependent variable matching the dependent variable of the best match row such that M (x, y) is minimized, where $$M(x, y) = \sum_{i=1}^{n} w_i(x_i - y_i)^2,$$

where n is the number of the weighted independent variable columns having a dependent variable matching the dependent variable of the best match row, w is a weight of a independent variable column, x is a stored independent input variable for a particular independent variable column, and y is a received sensor independent input variable corresponding to the same independent variable column as the stored independent input variable; and
   storing the received sensor independent input variable data within a new row of the data table if the weight modification produces a net overall improvement in dependency mapping by the data table.

13. The computer-implemented method of claim 12, wherein if negative user feedback is received, the step of modifying a weight of one or more of the weighted independent variable columns comprises:
   halving the weights of the independent variable columns wherein the best match row independent input variables match the received sensor independent input variable data;

doubling the weights of the independent variable columns wherein the best match row independent input variables does not match the received sensor independent input variable data; and normalizing all of the weights of the weighted independent variable columns.

14. The computer-implemented method of claim 12, wherein if positive user feedback is received, the step of modifying a weight of one or more of the weighted independent variable columns comprises:

doubling the weights of the independent variable columns wherein the best match row independent input variables match the received sensor independent input variable data;

halving the weights of the independent variable columns wherein the best match row independent input variables does not match the received sensor independent input variable data; and normalizing all of the weights of the weighted independent variable columns.

15. The computer-implemented method of claim 12, wherein the data table operates on a move-to-head basis, wherein the new row of the data table is acquired at the head of the data table.

16. A computer-readable storage medium having a method stored thereon, the method represented by computer-readable programming code, the method comprising the steps of:

selecting, from a data table containing a plurality of weighted independent variable columns and a plurality of rows, wherein each of the weighted independent variable columns represents an independent input variable feature and each row represents a set of stored independent input variables and a corresponding stored dependent variable, a row that best matches received sensor independent input variable data from at least one vehicle sensor; and causing a vehicle accelerator to gradually accelerate a vehicle to a vehicle acceleration level corresponding to the stored dependent variable of the selected best match row;

modifying a weight of one or more of the weighted independent variable columns based upon received user feedback to the vehicle acceleration level, such modification including modifying the weight of the weighted independent variable columns having a dependent variable matching the dependent variable of the best match row such that M (x, y) is minimized, where $$M(x, y) = \sum_{i=1}^{n} w_i(x_i - y_i)^2,$$

where n is the number of the weighted independent variable columns having a dependent variable matching the dependent variable of the best match row, w is a weight of a independent variable column, x is a stored independent input variable for a particular independent variable column, and y is a received sensor independent input variable corresponding to the same independent variable column as the stored independent input variable; and storing the received sensor independent input variable data within a new row of the data table if the weight modification produces a net overall improvement in dependency mapping by the data table.

17. The computer-readable storage medium of claim 16, wherein if negative user feedback is received, the step of modifying a weight of one or more of the weighted independent variable columns comprises:

halving the weights of the independent variable columns wherein the best match row independent input variables match the received sensor independent input variable data;

doubling the weights of the independent variable columns wherein the best match row independent input variables does not match the received sensor independent input variable data; and normalizing all of the weights of the weighted independent variable columns.

18. The computer-readable storage medium of claim 16, wherein if positive user feedback is received, the step of modifying a weight of one or more of the weighted independent variable columns comprises:

doubling the weights of the independent variable columns wherein the best match row independent input variables match the received sensor independent input variable data;

halving the weights of the independent variable columns wherein the best match row independent input variables does not match the received sensor independent input variable data; and normalizing all of the weights of the weighted independent variable columns.

19. The computer-readable storage medium of claim 16, wherein the data table operates on a move-to-head basis, wherein the new row of the data table is acquired at the head of the data table.

20. The computer-readable storage medium of claim 16, wherein the received sensor independent input variable data represents one or more sensed road conditions.

\* \* \* \* \*